United States Patent [19]
Yasui

[11] Patent Number: 4,863,229
[45] Date of Patent: Sep. 5, 1989

[54] OPTICAL INFORMATION TRANSMITTING DEVICE

[75] Inventor: Toru Yasui, Nara, Japan

[73] Assignee: Sharp Kabushiki Kaisha, Osaka, Japan

[21] Appl. No.: 801,518

[22] Filed: Nov. 26, 1985

Related U.S. Application Data

[63] Continuation of Ser. No. 466,952, Feb. 16, 1983, abandoned.

[30] Foreign Application Priority Data

Feb. 17, 1982 [JP] Japan ................................. 57-24875

[51] Int. Cl.⁴ ............................ G02B 6/00; H01J 5/16
[52] U.S. Cl. .............................. 350/96.10; 350/96.11; 350/96.15; 350/96.16; 250/227
[58] Field of Search .............. 350/96.10, 96.15, 96.16, 350/96.19, 96.20, 96.11, 96.12; 250/227; 362/32; 370/1, 3

[56] References Cited

U.S. PATENT DOCUMENTS

| 4,029,391 | 6/1977 | French | 350/96.10 |
| 4,109,997 | 8/1978 | Iverson | 350/96.15 |
| 4,151,582 | 4/1979 | Grunberger | 350/96.10 |
| 4,447,118 | 5/1984 | Mulkey | 250/227 X |
| 4,753,506 | 6/1988 | Einhorn et al. | 350/96.15 |

FOREIGN PATENT DOCUMENTS

| 1161826 | 1/1964 | Fed. Rep. of Germany | 350/96.10 |
| 53-79560 | 7/1978 | Japan | 350/96.15 |
| 54-100253 | 3/1979 | Japan | 350/96.20 |
| 56-19001 | 2/1981 | Japan | 350/96.15 |
| 56-32104 | 4/1981 | Japan | 350/96.10 |

Primary Examiner—William L. Sikes
Assistant Examiner—Brian M. Healy
Attorney, Agent, or Firm—Birch, Stewart, Kolasch & Birch

[57] ABSTRACT

An optical information transmitting device which uses light beams in a system to transfer information between pieces of apparatus, comprises an elongated optical information transmitting means, made of a transparent material, and a light emitting means located at about the center of the optical information transmitting means, the optical information transmitting means leading one part of the light generated by the light emitting means, with total reflection, to a scattering means provided at both longitudinal ends of the optical information transmitting means, and after the light is scattered it is radiated outward, and, in addition, this optical information means receives light generated by an outside apparatus and conducts it to a light receiving means.

9 Claims, 1 Drawing Sheet

OPTICAL INFORMATION TRANSMITTING DEVICE

This application is a continuation of application Ser. No. 466,952 filed on Feb. 16, 1983 now abandoned.

BACKGROUND OF THE INVENTION

The present invention relates to an optical information transmitting device which is especially useful in a system for transmitting information from the central processing unit (CPU) of a computer to equipment such as a terminal machine, using light beams.

Recently, there has been remarkable progess in the development of the techology of optical fiber cable and peripheral parts and equipment, so that communication and transmission systems making the best use of the distinctive features of this technology are being actively and widely introduced.

Conventionally, in information processing machines such as personal computers and office computers, the use of wireless transmission devices using light to transfer information between the CPU and the peripheral units encountered some technical problems, namely, as in the case of the optical fiber and electrical wire, there are restrictions in the relationship of the mutual positioning of the transmitting and receiving equipment, such that the advantages of the wireless are not attained. When light is used for the transmission of information between these pieces of equipment, it is particularly necessary that the directions of light emission and light reception be exceedingly large, and that there be no shadow created in the vicinity of the equipment. The path of the light and the positioning the equipment are both restricted, and in addition a small obstacle will render transmission impossible, damaging the reliability of the system.

Furthermore, when multiple light emission and light receiving devices are provided in the vicinity of the apparatus, it is difficult to make the system operate effectively, considering the economical efficiency, the electrical consumption, and scattered light from optical sensors, as well as electrical noise.

SUMMARY OF THE INVENTION

The present invention has the objective of providing an optical information transmission device which can easily be mass produced at a low price, and in which, especially in a system involving information transfer which uses light beams between pieces of apparatus (differing from a conventional device which has installed within it an optical information transmitting device, i.e., optical fiber, laser, prism, or similar type of device, in which the direction of reflection is sharply restricted) the directions in which the light is reflected is expanded in order that the positioning of the apparatus sending and receiving the transmission passing through space is not restricted, and the light receiving and emitting sections are collected together in one location, and transmission in both directions is possible, so that, as in the case of an optical fiber, accurate alignment is unnecessary.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

Pursuant to the above objects, in accordance with the present invention, a device is provided which comprises an elongated solid (not hollow) optical information transmitting means shaped of a transparent glass or resin, a light scattering means, capable of scattering light, on both longitudinal ends of the optical information transmitting means, a light emitting means almost in the center of the optical information transmitting means also, and a light receiving means almost in the center of the optical information transmitting means. The abovementioned optical information transmitting means leads one part of the light generated by the light emitting means, with total reflection, to the scattering means where it is scattered and radiated outward. Furthermore, this optical information transmitting means receives information in the form of light generated by an outside apparatus and directs it to the abovementioned light receiving means.

BRIEF DESCRIPTION OF THE DRAWINGS

The present invention will be better understood from the detailed description given hereinbelow and the accompanying drawings which are given by way of illustration only, and thus are not limitative of a present invention and wherein.

DETAILED DESCRIPTION OF THE INVENTION

The following is a detailed description of one embodiment of the present invention with reference to the drawings.

Figure 1:
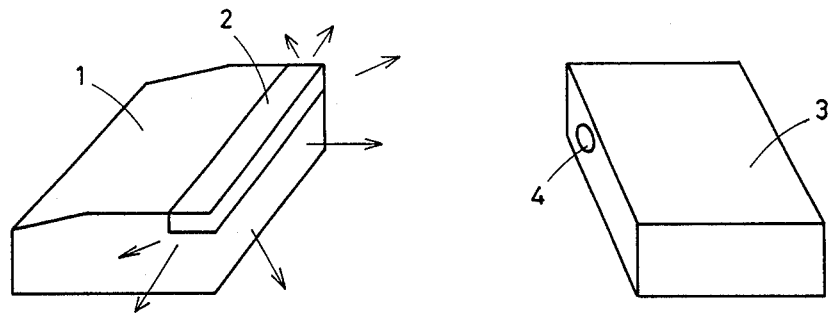
FIG. 1 is a system configuration showing an outline of the light emitting system between devices according to the present invention.

FIG. 1 is a system configuration showing an outline of the light emitting system between devices according to the present invention. In the drawing, to provide a device which can both emit and receive light, including infrared light, the device comprises an apparatus 1, which cohld be a CPU, and a peripheral device 3, such as a terminal machine. An optical transmission-reception path is created by means of an optical information transmitting device 2, which is included in the apparatus 1. There is also provided an optical transmission-reception section 4 in the peripheral device 3. The optical information transmitting device 2 collects the light signal created in the inner section of the apparatus 1, and emits it almost uniformly over more than a 180-degree range of the circumference of the apparatus 1. Conversely, the light received from the circumference enters the optical information transmitting device 2 along the reverse path of the transmitted light, and is conducted into the light receiving element in the internal section of the apparatus 1. From the fact that the optical information transmitting device 1 is capable of emitting light to, or receiving light from, its periphery, there is practically no restriction of positioning the peripheral device 3.

Figure 2:
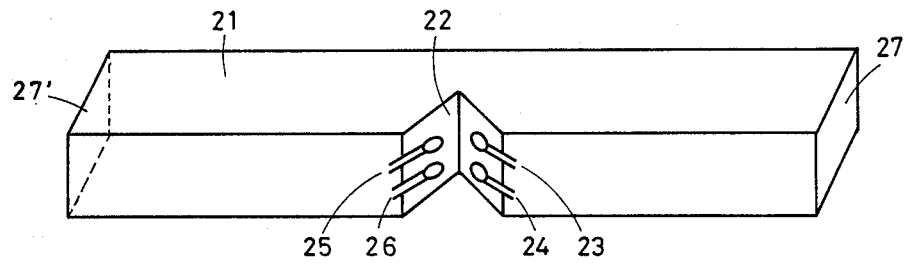
FIG. 2 is an oblique view showing the configuration of the optical information transmitting device which has the light emitting system of FIG. 1.

FIG. 2 is an oblique view showing the configuration of the optical information transmitting device 2. The optical information transmitting device 2 is not hollow and is made of transparent glass or acrylic resin, so that its exterior faces are finished in a mirror surface, and both of its ends 27 and 27' are frosted. Located in the center of the optical information transmitting device 2, as shown in the drawing, are light emitting elements 23 and 25, and light receiving elements 24 and 26. The distinctive features of the configuration of the optical information transmitting device 2 are that it is not hollow, it is made of transparent glass or resin, etc., and is of bar shape, with the ends 27 and 27' frosted and the other surfaces having a mirror finish. A cut-out section 22 is provided which forms almost a right angle surface with its apex at the center section of the bar. In the cut-out section 22, light emitting elements and light receiving elements are positioned in the two cut surfaces. In the drawing, there are sown two units of each of the light emitting and light receiving elements, but when elements necessary for reflection in many directions are used, it is acceptable to install one of each in the center section of the optical information transmitting device 2.

Figure 3:
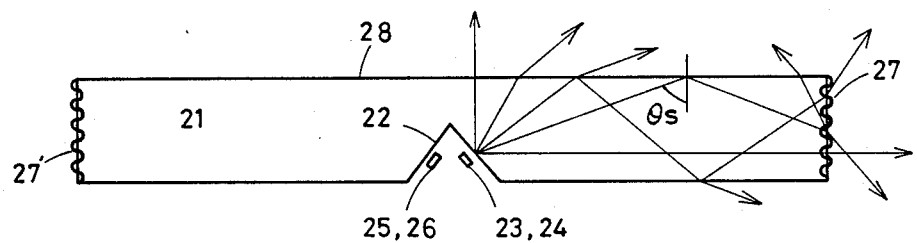
FIG. 3 is a plan view of the optical information transmitting device.

Using these light propagating elements, as shown in FIG. 3, the light beam radiating from the light emitting element 23 is incident on the cut surface of the optical information transmitting device 2, and is propagated into the glass or resin, which has a refractive index larger than that of the air, and is scattered from the surface 28. However, when the angle $\theta_s$ in the surface 28 is greater than the critical angle (about 40 to 50 degrees; depending on the material of construction of the optical information transmitting device, $\sin \theta_s = n_o/n_f$, where $n_f$ is the refractive index of the optical information transmitting device and $n_o$ is the refractive index of the air), total reflection occurs, and the light is dispersed from the end surfaces 27 and 27' in all directions. Also, light reflected by the end surfaces 27 and 27' is transmitted into the optical information transmitting device 2 and is scattered out from all the surfaces. That is to say, its light scattered out by the surface 28 of the optical information transmitting device 2 is uniformly broadcast around the cut section 22 in many directions. The light reflected by the surface 28 or emitted by the light emitting element 23 is conducted with good efficiency, utilizing total reflection greater than the critical angle, toward the two end surfaces 27 and 27', and is dispersed in all directions from the end surfaces 27 and 27', and it is possible for it to reflect in many directions, considerably exceeding 180 degrees. Because these end surfaces 27 and 27', working just like a plane surface light source, emit light in three dimension, it is as though there were three light sources inside the optical information transmitting device 2, and, even if there are a number of obstacles in the space through which the transmission is being routed, their influence is diminished and it is possible to increase the reliability of the transmission. If one section of the front surface or face 28 of the optical information transmitting device 2 is given a frosted finish, it is possible to make this effect even greater.

Figure 4:
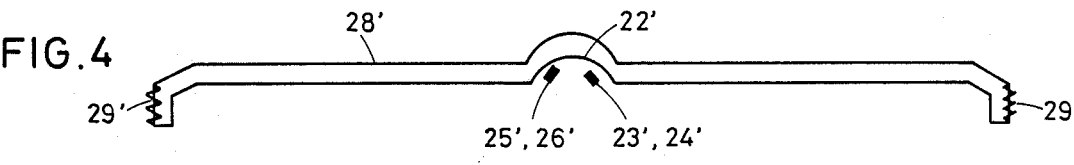
FIG. 4 is a plan view of another embodiment of the optical information transmitting device.

To avoid forming thick sections, the shape shown in FIG. 4 is suitable. Here, instead of a cut surface, that section of the resin plate is molded into a curved form, as shown in the diagram, and also, the construction is such that the end surfaces are bent in two steps, and the light is conducted to frosted surfaces 29,29'.

In addition, in the previously discussed optical information transmitting device (FIG. 3), by enclosing a surface where there is no entrance or exit for the light at the back of the center cut section, with a light reflecting metallic foil, it is possible to increase the efficiency of the light transmission.

This type of optical information transmitting device differs from a device such as the conventional optic fibers and prisms, which have the objective of collecting optical energy and transmitting at a good efficiency. The present invention is related to a device especially for carrying out transmission through indoor space, widening directions, and transmitting light by reflecting light, and while transmitting light, the same optical information transmitting device is intended to gather light from the periphery from the same many directions.

When the optical information transmitting device according to the present invention is transmitting light through space between the CPU and peripheral such as in a personal computer or similar apparatus, depending on what is used as an interface between the light emitting element (for example, an LED, etc.) and the light receiving element (for example, a photodiode, etc.), it disperses the light widely, or focuses it. From the fact that it can greatly relieve the position limitations of the respective devices, neither cord nor cable is required and it is possible to transmit the light in a wireless state.

By use of the present invention as explained above, the selection range of the installed locations of the apparatus which transmit light through space is expanded and the reliability of the light transmission improved. The number of light emitting and light receiving elements is decreased, the electrical consumption reduces, and the electrical S/N ratio is increased. In addition, transmission in both directions is realized, and the alignment accuracy like optical fiber and the normal optic apparatus is not required, so that it is possible to obtain a low-priced optical information transmitting device produced by mass production.

The invention being thus described, it will be obvious that the same may be varied in many ways. Such variations are not to be regarded as a departure from the spirit and the scope of the invention, and all such modifications are intended to be included within the scope of the following claims.

What is claimed is:

1. A system for optically transmitting information between first and second electrical devices spaced by a substantial distance from each other by an air space absent any optical coupling means therein, comprising:
   (a) a first electrical device;
   (b) a solid, transparent, bar-shaped optical transmitting means disposed in said first electrical device, said transmitting means having an obverse face, end faces orthogonal and contiguous to said obverse face, and a rear face opposite said obverse face finished to have a mirror surface, said rear face opposite said obverse face having a cut-out disposed substantially equidistant between said end faces;
   (c) light emitting means disposed in said cut-out for directing a first portion of light containing said information through said obverse face toward said second electrical device through said air space, said obverse face totally reflecting a second portion of the light incident thereon toward said end faces;

(d) scattering means on said end faces for directing light outwardly therefrom in plural directions over at least a 180 degree range with respect to said end faces to locations which include said second electrical device, the first portion of light emitted from said obverse face and the second portion emitted from said scattering means conjointly forming a light information beam for transmitting optical information to said second electrical device over at least a 180 degree range with respect to the rear face of said light emitting means; and (e) light receiving means in said second electrical device for optically receiving said information from either said first or second portions of light which constitute said light information beam, said second electrical device being selectively positionable within the range of said light information beam.

2. The system of claim 1 wherein there is further included a light receiving means in said cut-out and a light-emitting means in said second electrical device for transmitting light information from said second electrical device to the first electrical device via said bar-shaped optical means.

3. The system of claim 2 wherein said scattering means comprises frosted surfaces on said end faces.

4. The system of claim 1 wherein said scattering means comprises frosted surfaces on said end faces.

5. The system of claim 1 wherein said cut-out is a V-shaped groove.

6. The system of claim 1 wherein said cut-out is a semicircular groove.

7. The system of claim 3 wherein said obverse face has a frosted finish.

8. The system of claim 4, wherein said obverse face has a frosted finish.

9. The system of claim 1, wherein a light reflecting material is provided behind said cut-out.

* * * * *